United States Patent
Scheffer et al.

(10) Patent No.: US 9,336,781 B2
(45) Date of Patent: May 10, 2016

(54) CONTENT-AWARE SPEAKER RECOGNITION

(71) Applicant: SRI International, Menlo Park, CA (US)

(72) Inventors: Nicolas Scheffer, San Francisco, CA (US); Yun Lei, Palo Alto, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 119 days.

(21) Appl. No.: 14/264,916

(22) Filed: Apr. 29, 2014

(65) Prior Publication Data

US 2015/0112684 A1    Apr. 23, 2015

Related U.S. Application Data

(60) Provisional application No. 61/892,369, filed on Oct. 17, 2013.

(51) Int. Cl.
| | | |
|---|---|---|
| *G10L 15/00* | (2013.01) | |
| *G10L 15/18* | (2013.01) | |
| *G10L 15/20* | (2006.01) | |
| *G10L 17/00* | (2013.01) | |
| *G10L 17/14* | (2013.01) | |

(52) U.S. Cl.
CPC ..................... *G10L 17/14* (2013.01)

(58) Field of Classification Search
None
See application file for complete search history.

(56) References Cited

U.S. PATENT DOCUMENTS

| | | | | |
|---|---|---|---|---|
| 4,837,830 A | * | 6/1989 | Wrench, Jr. ............. | G10L 17/00 704/238 |
| 6,842,734 B2 | * | 1/2005 | Yamada ................ | G10L 15/063 704/233 |
| 7,852,993 B2 | * | 12/2010 | Ju ..................... | H04M 3/42042 379/88.02 |
| 9,129,602 B1 | * | 9/2015 | Shepard ................ | G10L 21/013 |
| 2008/0195389 A1 | | 8/2008 | Zhang et al. | |
| 2013/0152092 A1 | | 6/2013 | Yadgar et al. | |
| 2013/0332165 A1 | * | 12/2013 | Beckley ................. | G10L 17/04 704/246 |
| 2014/0052680 A1 | | 2/2014 | Nitz et al. | |
| 2014/0052681 A1 | | 2/2014 | Nitz et al. | |
| 2014/0136013 A1 | | 5/2014 | Wolverton et al. | |
| 2014/0136187 A1 | | 5/2014 | Wolverton et al. | |
| 2014/0236600 A1 | * | 8/2014 | Lu ........................ | G10L 15/063 704/251 |

FOREIGN PATENT DOCUMENTS

WO    2011028844 A2    3/2011

OTHER PUBLICATIONS

U.S. Appl. No. 14/253,503, filed Apr. 15, 2014.
U.S. Appl. No. 61/826,372, filed May 22, 2013.
U.S. Appl. No. 13/866,509, filed Apr. 19, 2013.
U.S. Appl. No. 13/891,858, filed May 10, 2013.
U.S. Appl. No. 13/891,864, filed May 10, 2013.
U.S. Appl. No. 13/954,613, filed Jul. 30, 2013.
U.S. Appl. No. 13/966,665, filed Aug. 14, 2013.

(Continued)

*Primary Examiner* — Satwant Singh
(74) *Attorney, Agent, or Firm* — Barnes & Thornburg LLP; Thomas J. McWilliams; Edward F. Behm, Jr.

(57) ABSTRACT

A content-aware speaker recognition system includes technologies to, among other things, analyze phonetic content of a speech sample, incorporate phonetic content of the speech sample into a speaker model, and use the phonetically-aware speaker model for speaker recognition.

9 Claims, 5 Drawing Sheets

(56) References Cited

OTHER PUBLICATIONS

Hinton et al., "Deep Neural Networks for Acoustic Modeling in Speech Recognition," IEEE Signal Processing Magazine vol. 29, Apr. 27, 2012, 27 pages.

Thomas et al., "Deep Neural Network Features and Semi-Supervised Training for Low Resource Speech Recognition," 2013 IEEE International Conference on Acoustics, Speech and Signal Processing (ICASSP), May 2013, 5 pages.

"Phoneme", http://en.wikipedia.org/wiki/Phoneme, accessed Aug. 28, 2014, 9 pages.

* cited by examiner

CONTENT-AWARE SPEAKER RECOGNITION

CROSS-REFERENCES TO RELATED APPLICATIONS

This application claims the benefit of and priority to U.S. Provisional Patent Application Ser. No. 61/892,369, filed Oct. 17, 2013, which is incorporated herein by this reference in its entirety.

GOVERNMENT RIGHTS

This invention was made in part with government support under contract number D10PC20024, awarded by the Department of the Interior. The United States Government has certain rights in this invention.

BACKGROUND

Traditionally, a universal background model (UBM) is used to analyze acoustic signals for speaker recognition. The UBM outputs numerical acoustic indices that do not correspond to the phonetic or lexical content of the input speech signal. Speech content and the distortions it produces in the acoustic signal have been largely ignored in prior work on text-independent speaker verification.

A deep neural network (DNN) is a feed-forward neural network that is both much larger (e.g., a few thousand nodes per hidden layer) and much deeper (e.g., 5-7 hidden layers) than traditional neural networks. The application of DNNs in other fields can be straightforward if each output node of the DNN represents one of the classes of interest. Efforts are being made to adapt DNNs for speech recognition. However, applying DNNs directly to speaker recognition is much more challenging due to the limited amount of speaker-specific training data and the uncertainty of the speaker's identity.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Voice biometric systems need to achieve very high accuracy in order to be useful in a production environment. Mismatch between a pre-created model of a user's voice and his/her actual voice at test time is one of the main challenges to achieving high levels of accuracy. Some common types of mismatches, such as mismatches resulting from channel characteristics or noise, have been studied and partially resolved. However, the problem of mismatch between actual spoken content; that is, an incorrect speaker determination resulting from differences between the speaker's current speech and the speaker's pre-recorded speech represented in the pre-created model, is not adequately handled by existing systems.

Effectively handling such mismatches can be important in speaker recognition systems, particularly "text-independent" systems, which seek to recognize or confirm speaker identity based on the relatively natural, fluid speech of a current speaker (as opposed to biometric systems that require users to speak pre-defined phrases, such as passwords, at specific times). Existing text-independent voice biometric systems tend to assume that, given large enough samples of speech, mismatches in speech content are normalized out. However, in practice, this assumption is often not true.

As used herein, "voice biometric system" may refer to, among other things, speaker recognition systems, speaker identification systems, speaker verification systems, speaker authentication systems, or any other automated system for identifying or confirming the identity of the speaker of a sample of speech. In general, voice biometric systems seek to determine the person who has spoken (in contrast to speech recognition systems, which seek to determine the words that have been spoken).

Figure 1:
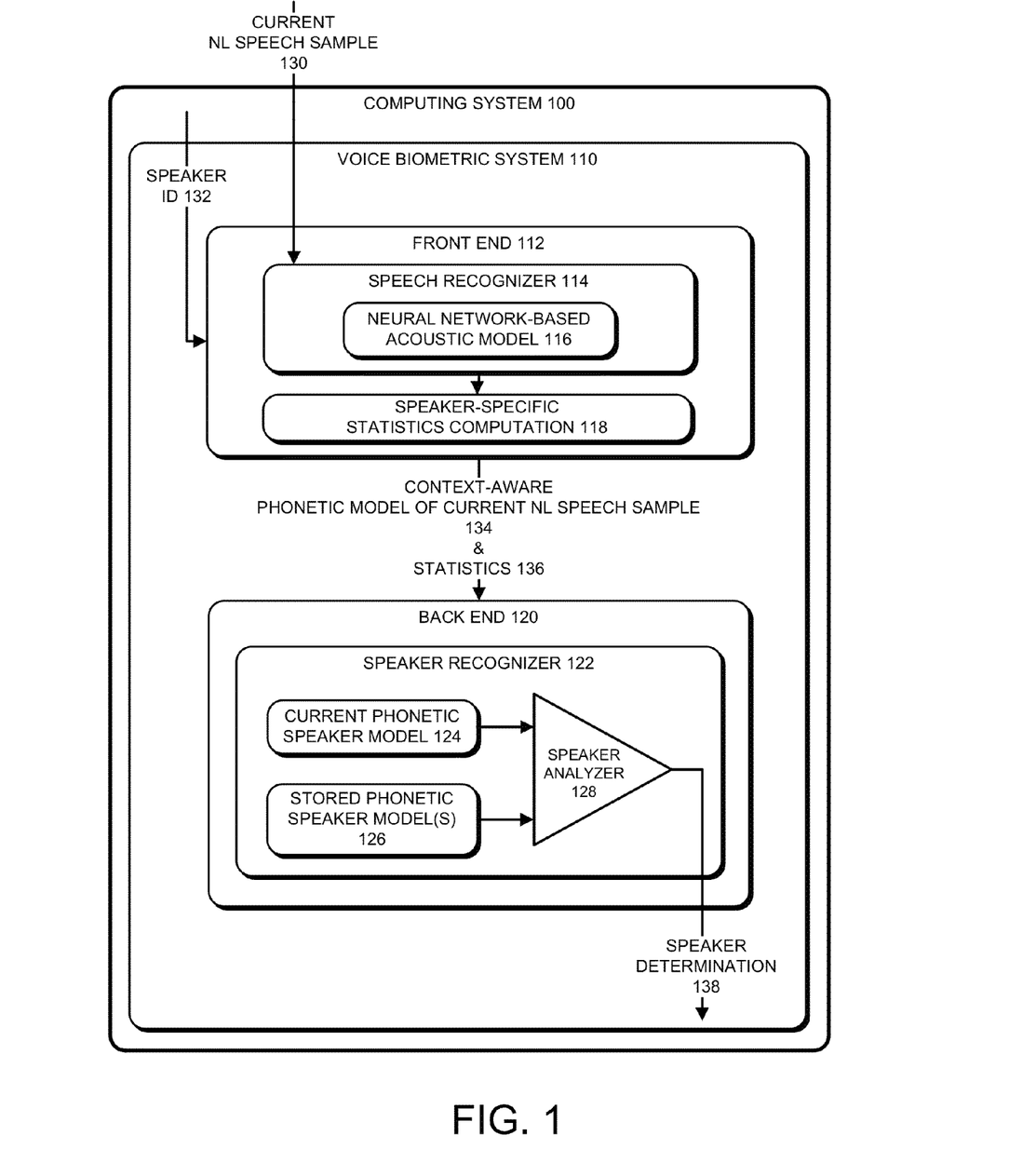
FIG. 1 is a simplified module diagram of an environment of at least one embodiment of a computing system for performing phonetically-aware speaker recognition as disclosed herein.

Referring now to FIG. 1, a computing system 100 includes an embodiment of a voice biometric system 110, shown in the context of an environment that may be created during the operation of the computing system 100 (e.g., an online or offline execution or "runtime" environment). The voice biometric system 110 and portions thereof are embodied as a number of software and/or hardware computer-readable modules, components, and/or data structures, in accordance with the requirements of a particular design or implementation of the system 110. The computing system 100 receives audio input signals, including samples of natural language (NL) speech 130, from time to time, through an audio capture/acquisition device such as a microphone. An audio signal that includes an NL speech sample 130 may also be referred to as a "speech signal." As used herein, "natural language" may refer to, among other things, words, phrases, verbal expressions, and/or combinations thereof, in human speech, that normally arise in an unpremeditated fashion as the result of the innate facility for language possessed by the human intellect (as distinguished from, for example, computer-generated codes, such as CAPTCHAs—"Completely Automated Public Turing tests to tell Computers and Humans Apart"). However, while the illustrative embodiments refer to natural language speech samples, it should be understood that aspects of the voice biometric system 110 are applicable to both text-independent and text-dependent voice biometric systems. For example, even if a speech sample 130 includes a prescribed password or code, it may be desirable to analyze the phonetic content of the speech sample 130 to detect a speaker-specific pronunciation of the password and thereby improve the accuracy of a text-dependent voice biometric system.

The speech signal received by the computing system 100 may include a speaker identifier 132, or the computing system 100 may separately access or obtain the speaker identifier 132. For example, the speaker of the current speech sample 130 may assert a name as part of the speech sample 130, or the computing system 100 may use another identifier, such as a username or a computing device identifier (e.g., a mobile device identifier, a hardware identifier, or a network address), as the speaker identifier 132. The voice biometric system 110 takes the speaker identifier 132 (if present) as an assertion, and then seeks to verify the asserted identity, rather than assuming that the speaker identifier 132 is a valid credential that correctly identifies the speaker of the speech sample 130.

A front end module 112 of the voice biometric system 110 uses speech recognition methods to create a context-aware phonetic model 134 of the current NL speech sample 130, and computes speaker-specific statistics 136 based on the phonetic model 134. The phonetic model 134 and the statistics 136 are used by a back end module 120 of the voice biometric system 110 to compare the current speech sample 130 to one or more stored (e.g., previously recorded) speech samples, where the stored speech sample(s) are represented by stored (e.g., previously created) phonetic speaker models 126. Based on the comparison of the current phonetic model 124 to the stored speaker model(s) 126, the back end module 120 outputs a speaker determination 138.

The illustrative front end module 112 includes a speech recognizer subsystem 114 and a speaker-specific statistics computation module 118. The speech recognizer subsystem 114 associates speech segments of the current speech sample 130 with speech content, e.g., phonemic, phonetic or lexical units such as phonemes, phones, tri-phones, or words. As used herein, "speech segment" may refer to, among other things, a portion of the input audio signal that contains the current NL speech sample 130 and/or a set of acoustic features that represents that portion of the speech signal. For example, a speech segment may constitute a portion of the speech sample 130 that is less than the entire sample 130. A speech segment may be referred to as a "time slice" or "frame" of the audio (speech) signal. The illustrative speech recognizer 114 aligns time with the phone-level content of the speech sample 130 so that the phonemic or phonetic content of each speech segment can be determined in the context of the temporally preceding and/or subsequent phonemic or phonetic content.

The speech recognizer 114 replaces the existing state-of-the-art front end for speaker recognition known as the universal background model (UBM). In other words, some embodiments of the voice biometric system 110 do not include a UBM at all. The illustrative speech recognizer 114 acts as a partial speech recognizer in that it does not require, e.g., language models or grammars. However, of course, a full automated speech recognition system (including language models and grammars) may be used in other embodiments if word- or phrase-level content is desired.

A neural network-based acoustic model 116 of the speech recognizer 114 generates output that can be directly input into the speaker recognition machinery of the voice biometric system 110, e.g., the speaker-specific statistics computation module 118 of the front end module 112 and/or the speaker recognizer 122 of the back end module 120. For example, the output of the neural network-based acoustic model 116 can be used directly to adapt Gaussian mixture models, produce i-vectors and output speaker determinations 138 (e.g., biometric scores) as is typically done in state-of-the-art speaker recognition systems.

To generate the speaker determinations 138, a speaker analyzer 128 of the speaker recognizer 122 compares the similarities between the current phonetic speaker model 124 and the stored phonetic speaker model(s) 126 at the level of the phonemic, phonetic or lexical content (e.g., at the phone or tri-phone level), rather than simply relying on the traditional acoustic features. For example, the speaker recognizer 122 may use a probabilistic linear discriminant analysis (PLDA) to compare one or more phones or phonemic characteristics of the current speaker model 124 to one or more similar phones or phonemic characteristics of the stored speaker model(s) 126 and generate the speaker determinations 138.

As used herein, "acoustic features" may refer to, among other things, discrete or continuous numerical values that each represent a characteristic of a raw acoustic (speech) signal. Acoustic features include numerical measurements of acoustic energy at different frequencies of the speech signal, which typically are calculated using a Fourier transform. Examples of acoustic features include the mel frequency cepstral coefficient (MFCC) and filter banks. A frame of a speech signal can be represented as a vector of these and/or other acoustic features.

In comparison, phones and phonemes indicate the speech content of the individual frames of the acoustic signal. A "phone," as used herein, may refer to, among other things, an alphanumeric or symbolic notation that represents a single unique speech sound. Phones can be combined with other phones to form a word or other verbal expression in a human-spoken language. A phone may correspond to a single vowel or consonant. In some cases, a combination of letters may produce a single phone (e.g., "th" and "ng"). Further, some letters of the alphabet produce different phones in different contexts (e.g., the short "a" in "rat" versus the long "a" in "rate"). A "phoneme" may refer to, among other things, the smallest unit of sound that has a distinct meaning to speakers of a particular language. For example, the pronunciation of "t" in "stick" and "tick" is similar enough in the English language that it is considered as the same phoneme, but the difference between the two pronunciations of "t" in another language may be significant and therefore constitute two different phonemes. Thus, the same phone may have different phonemic characteristics depending on the speaker's native language, for example. Phones can be denoted using a phonetic alphabet, such as the ARPAbet for American English or the International Phonetic Alphabet (IPA).

By associating phonetic or phonemic content with individual speech segments of the current NL speech sample 130, the voice biometric system 110 can capture speaker-specific characteristics (e.g., pronunciations) of lexical units (e.g., phonemes, phones, tri-phones, tri-phone sequences, or other utterances). For example, if two speakers each say the word "car"—within other, non-matching speech content—and one speaker has a British accent while the other speaker has a Southern American accent, the voice biometric system 110, or more particularly the speaker analyzer 128, can specifically compare the audio signal for the word "car" (a tri-phone) for both speakers while disregarding the other, non-matching speech content. In this way, the voice biometric system 110 can distinguish between the two speakers by comparing portions of the audio signal that correspond to similar phonetic units, and thereby more accurately detect mismatches. In contrast, traditional text-independent voice biometric systems cannot leverage phonetic or phonemic information in speaker comparisons.

Some embodiments of the front end 112 of the voice biometric system 110 are configured to integrate the phonetic or phonemic content of the speech sample (e.g., "speech content") directly into the speaker recognition pipeline. For example, some embodiments of the voice biometric system 110 connect the speech recognizer 114 and the speaker recognizer 122 "in series," as described in more detail below. This is in contrast to other systems that separately analyze the phone or word-level speech content and the low-level acoustic signals "in parallel," and then fuse or combine the results. Thus, while some embodiments of the voice biometric system 110 can be used in a system that has adopted a fusion approach, other embodiments of the voice biometric system 110 can achieve higher accuracy without the need for fusion.

Figure 2:
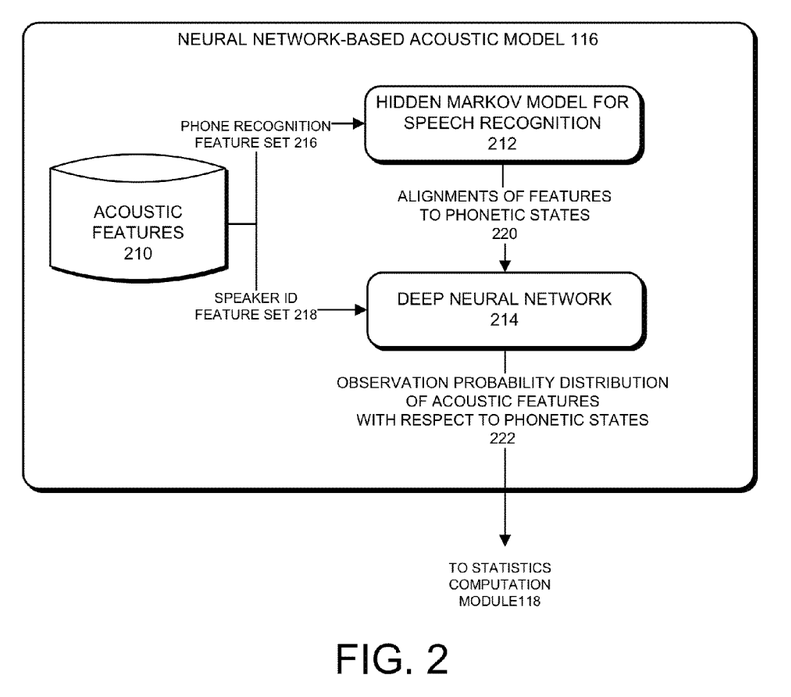
FIG. 2 is a simplified module diagram of at least one embodiment of the neural network-based acoustic model of FIG. 1.

Referring now to FIG. 2, an embodiment of the neural network-based acoustic model 116 is shown in more detail, in the context of an environment that may be created during the operation of the computing system 100 (e.g., an offline or online execution or "runtime" environment). The illustrative acoustic model 116 and portions thereof are embodied as a number of computer-executable modules, components, and/or data structures, including a searchable database of acoustic features 210 and machine learning algorithms such as a hidden Markov model (HMM) for speech recognition 212, and a deep neural network (DNN) 214. The acoustic features 210 include, for example, acoustic feature vectors that have been previously computed for a number of different speech samples (e.g., speaker-specific or speaker-independent training data).

In the illustrated embodiments, the hidden Markov model 212 and the acoustic features 210 are used to train the deep neural network 214 for automatic speech recognition (ASR). The ASR-trained DNN 214 is then used to associate phonetic content with the current speech sample 130. The DNN 214 outputs a phonetic representation of the current speech sample 130 (e.g., tri-phone sequences), which are then directly integrated into the statistics that are computed by the speaker-specific statistics computation module 118. With the DNN 214 configured in this fashion, the back end 120 may operate in the traditional way, without requiring any special modifications to handle the phonetically-aware speaker models 124, 126, in some embodiments.

The HMM 212 is a mathematical model that has defined therein a number of phonetic states. As used herein, a "phonetic state" or "class" may refer to, among other things, a combination of a phone (or tri-phone) and a possible context of the phone (or tri-phone). As an example, the phone [ah] (the short sound of the vowel "u") may sound differently when pronounced in the word "but" than when pronounced in the word "sum"). Thus, the context of the phone [ah] in the word "but" includes "after [b] and before [t]" while the context of the phone [ah] in the word "sum" includes "after [s] and before [em]." To capture these and other phonetic or phonemic differences, the HMM 212 can include a number of sequential states for each phone, where each of the sequential states models a portion of the phone. For instance, three sequential states may be used to model the beginning, middle, and end of the speaker's pronunciation of "[ah] after [b] and before [t]." As such, a phonetic state may capture a speaker-specific phonemic characteristic (such as an "accent"). The defined phonetic classes may correspond to tri-phone states. The tri-phone states may be obtained using a decision tree for automatic speech recognition.

The HMM 212 processes a set of the acoustic features 210 and aligns the acoustic features 210 to the defined phonetic states. Stated another way, the HMM 212 produces alignments 220 between acoustic features and phonetic states, which the DNN 214 uses to analyze the current speech sample 130. It should be noted that, with the use of the DNN 214, one set of acoustic features 216 may be used for speech recognition by the HMM 212 while a different set of features 218 may be used by the speaker-specific statistics computation module 118 to compute the sufficient statistics that are used by the back end 120 for speaker recognition (e.g., to obtain the speaker models 124, 126 and the speaker determinations 138). For example, the feature set 216 may include MFCC features and the feature set 218 may include filter banks. In this way, the voice biometric system 110 can use an "optimal" set of features to maximize phone recognition accuracy for posterior generation using the DNN 214, while using a different set of optimal features for speaker recognition.

The illustrative DNN 214 computes the posterior probability distribution 222 of the acoustic features with respect to each of the phonetic states in the HMM 212 given the current speech sample 130. The observation probability distributions 222 can be obtained from the posteriors and priors of the states using Bayes' rule. The posterior distributions 222 are used by the DNN 214 to predict the phonetic content of the speech sample 130. Once the posterior distributions 222 are computed, the zeroth and first order statistics are computed by the speaker-specific statistics computation module 118 (e.g., in the standard way used by state-of-the-art speaker recognition back end modules).

Referring again to FIG. 1, the speaker-specific statistics computation module 118 computes the standard speaker recognition statistics and passes or otherwise makes the computed statistics available to the back end module 120. In the back end module 120, the speaker recognizer 122 computes the current phonetic speaker model 124 (e.g., an i-vector) and the speaker analyzer 128 compares the current speaker model 124 to the stored speaker model(s) 126 (using, e.g., a probabilistic linear discriminant analysis or PLDA).

To create the current speaker model 124, the illustrative speaker recognizer 122 computes an i-vector model for a speech frame $x_t^{(i)}$ of an ith speech sample using the standard i-vector probability distribution:

$$x_t^{(i)} \sim \sum_k \gamma_{kt}^{(i)} \mathcal{N}(\mu_k + T_k \omega^{(i)}, \Sigma_k)$$

except that the classes k are not defined as the indexes of the Gaussians in a UBM, but rather the classes k are defined as a set of phonetic states, where each of the phonetic states can be modeled by a single Gaussian. Additional details describing the above-mentioned statistics and i-vector equations are set out in U.S. Provisional Patent Application Ser. No. 61/892, 369, which is incorporated herein by reference.

To illustrate a difference between the content-aware speaker model 124 (e.g., a content-aware i-vector) computed as disclosed herein and the conventional i-vector model, suppose a speaker pronounces a certain phoneme, "laal," very differently from the general population. Using the traditional UBM, the speech frames corresponding to this phoneme will likely not be aligned with the "laal" phoneme but rather with, for example, the "laol" phoneme. As a result, the conventional i-vector will not contain information about the fact that the speaker pronounces "laal" very differently from other speakers in the population, because the UBM model implicitly assumes that the speaker was, in fact, pronouncing laol and not laal.

In contrast, with the speaker model 124 (e.g., content-aware i-vector) computed with the phonetic states and the posteriors supplied by the neural network-based acoustic model 116 as disclosed herein, the speech frames corresponding to "laal" are assigned to the correct states (e.g., the phonetic states corresponding to tri-phones in which "laal" is the center phone), and a large shift in the means will result for those states. The speaker model 124 therefore reflects the fact that this speaker pronounces "laal" very differently from other speakers in the general population. With the classes of the content-aware i-vector model defined by the phonetic states, the speaker analyzer 128 is able to compare each speech frame with training data that corresponds to the same phonemic content. This, in turn, results in a speaker model 124 (e.g., a content-aware i-vector) that is estimated using the frames from the correct phonetic states for each class in the model. Additionally, since no hard decisions are made with respect to the phonetic content assignments, the robustness of the speaker model 124 is increased.

Figure 3:
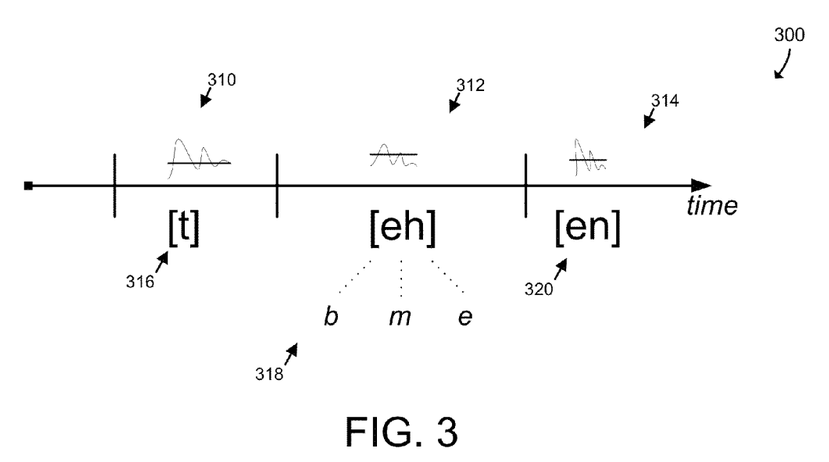
FIG. 3 is a simplified example of a phonetic representation of a speech sample that may be created by the computing system of FIG. 1.

Referring now to FIG. 3, a simplified illustration of a phonetic representation of a speech sample 300, which may be created by the computing system 100, is shown. The speech sample 300 is divided into time slices, and each time slice contains a speech segment, e.g., a portion of the acoustic signal, 310, 312, 314. Each speech segment is associated with corresponding speech content, in this case, the phones 316, 318, 320. Additionally, with reference to the phone 318, the phonetic state or context is illustrated in more detail (although the same analysis applies to any of the phones 316, 318, 320). The notation "b" refers to the beginning pronunciation of the phone, "m" refers to the middle portion of the phone, and "e" refers to the end of the phone 318. Thus, context can be determined with respect to each of the beginning, middle, and end states of the phone 318. The phonetic state or context of the phone 318 is also indicated by reference to the preceding phone 316 and/or the subsequently occurring phone 320. The temporal sequence of phones 316, 318, 320 constitutes a tri-phone.

Figure 4:
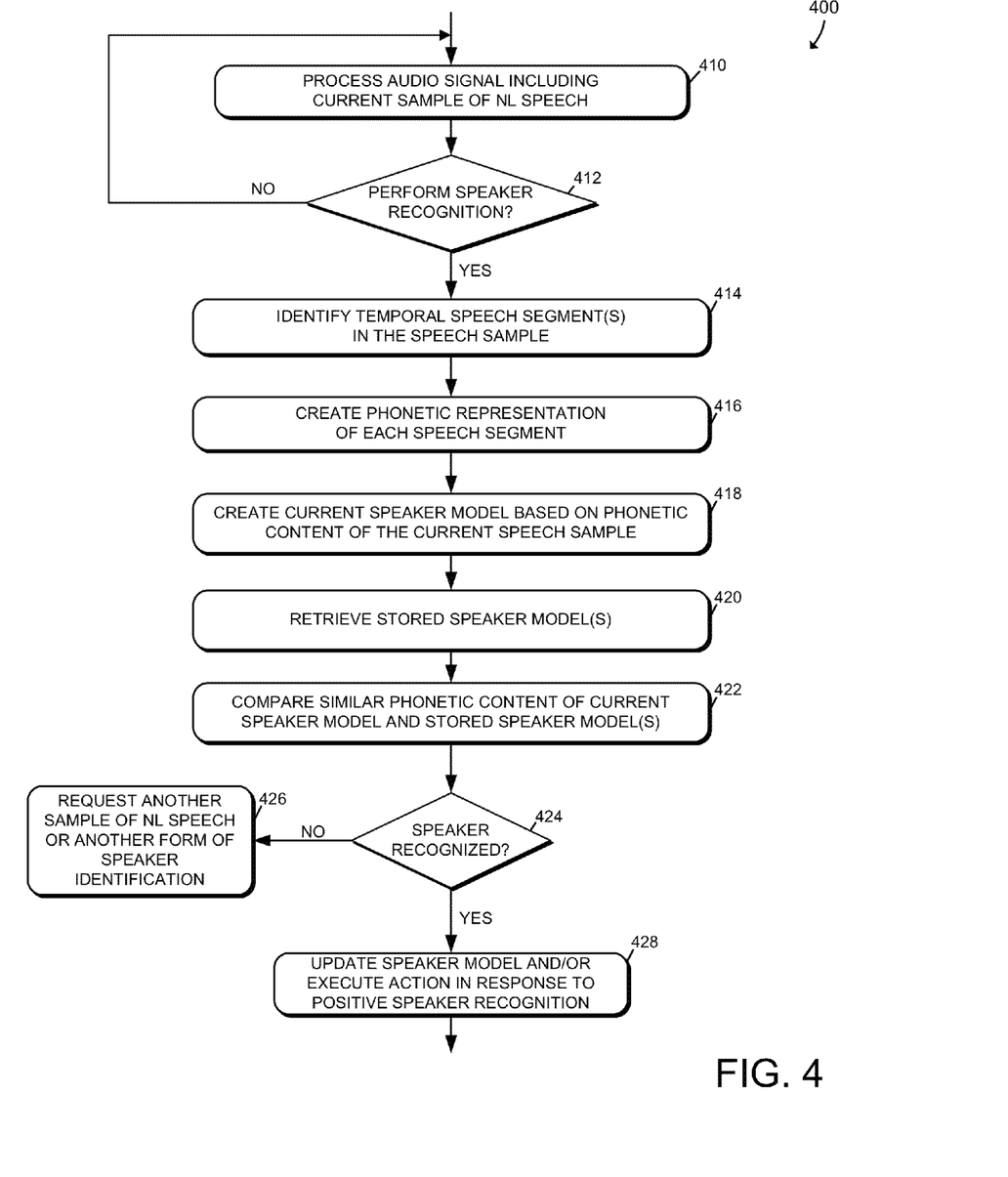
FIG. 4 is a simplified flow diagram of at least one embodiment of a method by which the computing system of FIG. 1 may perform speaker recognition.

Referring now to FIG. 4, an illustrative method 400 by which the computing system 100 may perform speaker recognition is shown. The method 400 may be embodied as computerized programs, routines, logic and/or instructions executed by the computing system 100, for example by the voice biometric system 110. At block 410, the system 100 processes an audio signal containing a current sample of natural language speech. To do this, the computing system 100 may, for example, receive an analog speech signal by microphone, utilize an analog-to-digital converter (ADC) to convert the analog signal to digital form, and record the digital form of the speech sample to computer memory or data storage as an audio file. In some embodiments, the "live" speech signal may have been previously received and stored in memory or data storage, in which case the system may simply retrieve the audio file containing the speech sample from memory or data storage, as the case may be, at block 410.

At block 412, the system 100 determines whether to perform speaker recognition on the speech sample obtained at block 410. In the context of another computer application, such as a virtual personal assistant, the system 100 may determine that speaker recognition does not need to be performed on a current round of dialog because the speaker's identity has already been verified through the methods disclosed herein or some other means. Of course, the system 100 may determine that speaker recognition does or does not need to be performed for any number of other reasons, at block 412. If the system 100 determines that speaker recognition does not need to be performed, the system 100 returns to block 410 to process another speech sample. If the system 100 determines that speaker recognition is to be performed, the system 100 proceeds to block 414. At block 414, the system 100 identifies the temporal speech segments (or "time slices" or "frames") of the current speech sample. The temporal speech segments may correspond to, for example, the sampling rate of the ADC or a multiple of the sampling rate. In some cases, overlapping speech segments may be used to ensure that an important feature of the signal is not missed.

At block 416, the computing system 100 creates a phonetic representation of each speech segment of the speech sample obtained at block 410. To do this, the computing system 100 utilizes a phonetically-aware acoustic model (such as the neural network-based acoustic model 116) to associate phonetic content (e.g., phonemes, phones or tri-phones) with each of the speech segments. The phonetic content may be associated with the corresponding speech segments by way of annotations, meta tags, data structures, or any other suitable methods. At block 418, the system 100 creates a current speaker model based on the phonetic content of the current speech sample. The current speaker model (e.g., a speaker model 124) may be embodied as a data structure having a number of "slots" or "fields" for storing data values including an asserted speaker identity (e.g., a speaker identifier 132), the speech segment (e.g., the acoustic signal or its acoustic features), and the phonetic content determined at block 416. The current speaker model may be developed as a content-aware i-vector model as described above and in the above-referenced provisional patent application.

At block 420, the computing system 100 retrieves one or more stored speaker model(s) (e.g., stored speaker models 126) from, for example, memory or data storage. The illustrative stored speaker model(s) may include both speaker-specific and speaker-independent models, however, at block 420 the computing system 100 searches for and retrieves a model 126 that corresponds to the asserted speaker identity contained in the current speaker model 124. As such, the retrieved speaker model(s) include one or more phonetically-aware speaker models that have been created and associated with the asserted speaker identity. Such previously created models may have been developed through a formal enrollment process in which the speaker records a sample of speech specifically for use in later speaker verification. In other cases, the retrieved speaker model may be developed over time through a speaker's use of a speech-enabled computer application, such as a virtual personal assistant. In other words, some embodiments of the computing system 100 may execute a background process to automatically generate the stored speaker model(s) from time to time in response to natural language speech that is captured/acquired during a speaker's normal use of another computer application, rather than through a formal enrollment process.

At block 422, the computing system compares the current speaker model developed at block 418 to the speaker model(s) retrieved at block 420. To do this, the computing system can use the information provided by the neural network-based acoustic model 116 in combination with the statistics computed by the statistics computation model 118 to determine phonetic content of the current speaker model that is similar to phonetic content in a stored speaker model 126 and disregard any other phonetic content that is not similar. For example, if both the current speech sample and a stored speech sample include the word "cat" (a tri-phone), the system 100 may analyze the similarity of the phonetic content of the word "cat" in the current speaker model with the phonetic content of the word "cat" in the stored speaker model. In some cases, the system 100 may analyze similarity at the phone or phoneme level, alternatively or in addition to the tri-phone level. The system 100 may generate a biometric score by computing the similarity between the current speaker model 124 and the stored speaker models 126 mathematically, e.g., using a PLDA. If there are multiple stored speaker models 126, the system 100 may analyze the similarity of the current speaker model 124 to each of the stored speaker models or a subset of the stored speaker models 126, and make a match determination based on the similarity of the current speaker model 124 to all or a subset of the stored speaker models 126.

At block 424, the computing system 100 determines, based on the biometric score(s) computed at block 422, whether there is a match between the speaker identity associated with the speech sample processed at block 410 (e.g., a speaker identity asserted by the speaker of the current speech sample), and the speaker identified with one or more of the stored speaker models 126. If the system 100 determines that the current speaker model 124 matches one or more of the stored models 126, the system may update a stored speaker model and/or execute some other action in response to the positive speaker recognition, at block 428. For instance, if the speaker is positively recognized, the system 100 may continue on to perform another function of a computer application, such as providing requested (but, e.g., secure/private/confidential/ classified) information, or performing an electronic transaction. If the system 100 determines that the speaker is not positively recognized (e.g., the asserted speaker identity does not match the speaker identity of the stored speaker model), then at block 426, the system 100 may request another speech sample and repeat the method 400, or may request another form of speaker identification (such as a typed password, another form of biometric information, etc.), or may take some other action consistent with the mismatch between the current speech sample and the stored speaker model. For instance, the system 100 may restrict access to features, functionality, or content of another computer application, at block 426.

Example Usage Scenarios

Among other things, the voice biometric system 110 can achieve significant improvements in accuracy compared to traditional speaker recognition systems. The voice biometric system 110 has a wide variety of applications, including speaker verification and speaker authentication in online or automated financial services, credit card systems, call centers, customer service systems, e-commerce systems, and others. The voice biometric system 110 can also be used to "personalize" and therefore improve the accuracy of language translation and speech-to-text applications, as well as speech-based virtual personal assistant applications and any other application in which speaker recognition technology is needed. Additionally, the use of a neural network-based acoustic model 116 to feed the speaker recognizer 122 enables the voice biometric system 110 to handle a wider variety of sources of speech samples as inputs, including, for instance, speech transcripts and annotations. A simplified example of a banking application of the voice biometric system 110 is shown in FIG. 5.

Figure 5:
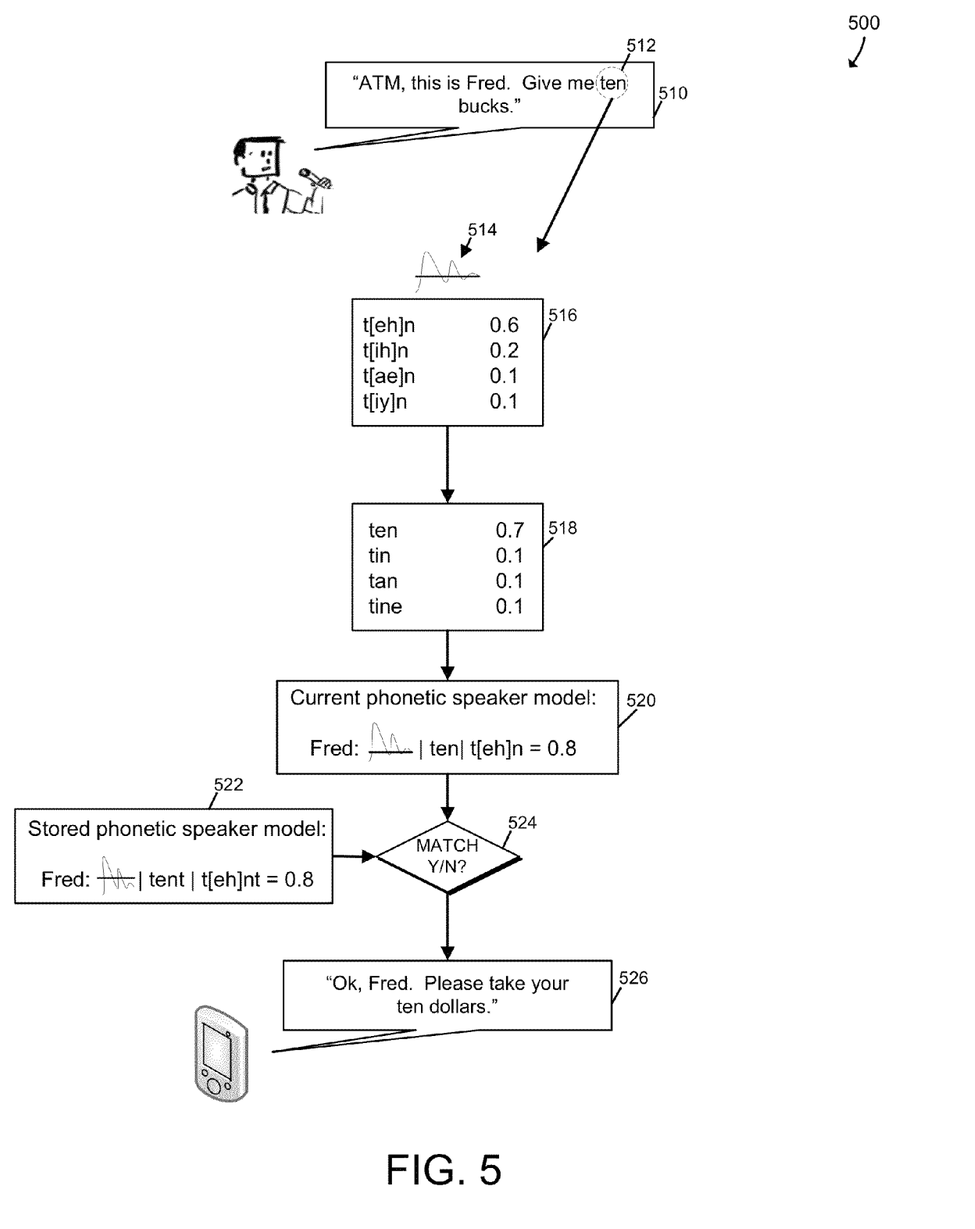
FIG. 5 is a simplified example of at least one embodiment of the computing system of FIG. 1 in operation.

Referring now to FIG. 5, a simple example 500 of the operation of an embodiment of the voice biometric system 110 is shown. The example begins with a speaker talking to a voice-enabled automatic teller machine of a bank. The speaker asserts an identity (Fred) and requests a withdrawal of ten dollars from his bank account. The system 100 captures the speech sample 510 and identifies a speech segment 512 of the acoustic signal that contains the word "ten." The system 100 analyzes the acoustic features of the portion of the acoustic signal 514, creates a phonetic representation including a phone-level representation 516 and a tri-phone level representation 518. The phone-level representation 516 indicates the mathematical (e.g. probabilistic) likelihood that the speech signal 514 contains each of the phones [eh], [ih], [ae], [iy] between the phone [t] and the phone [en]. For example, a higher numerical value may indicate a greater likelihood that the phone is correct. Similarly, the tri-phone level representation 518 indicates the mathematical (e.g. probabilistic or statistical) likelihood that the speech signal 514 corresponds to the tri-phones (e.g., words) ten, tin, tan, and tine. In the example, the phonetic representations 516, 518 indicate a high probability that the sample 514 corresponds to the word ten pronounced as "t[eh]n."

The system 100 combines the asserted identity (Fred), the speech signal 514, and the phonetic representation 516, 518 to create a current phonetic speaker model 520. The system 100 retrieves a stored phonetic speaker model 522 that matches the asserted speaker identity. Although the retrieved model 522 does not include the word "ten," it does include the word "tent" which contains the phonetic unit [eh] in a similar context (after [t] and before [en]). The system 100 compares the current and stored models 520, 522 at block 524, and determines that there is a match between the asserted speaker identity and the speaker identified with the stored speaker model 522. As a result, at block 526, the system 100 executes the action requested by the speaker in the speech sample 510. Thus, in this example and many others that can be similarly handled by the system 100, the speech content used for speaker recognition is contained in a sample of natural language speech that also contains a request for a computer system to perform another function or service. In this way, the system 100 can integrate speaker recognition technology into other user-oriented computer applications in a way that is natural and transparent to the user.

Implementation Examples

Figure 6:
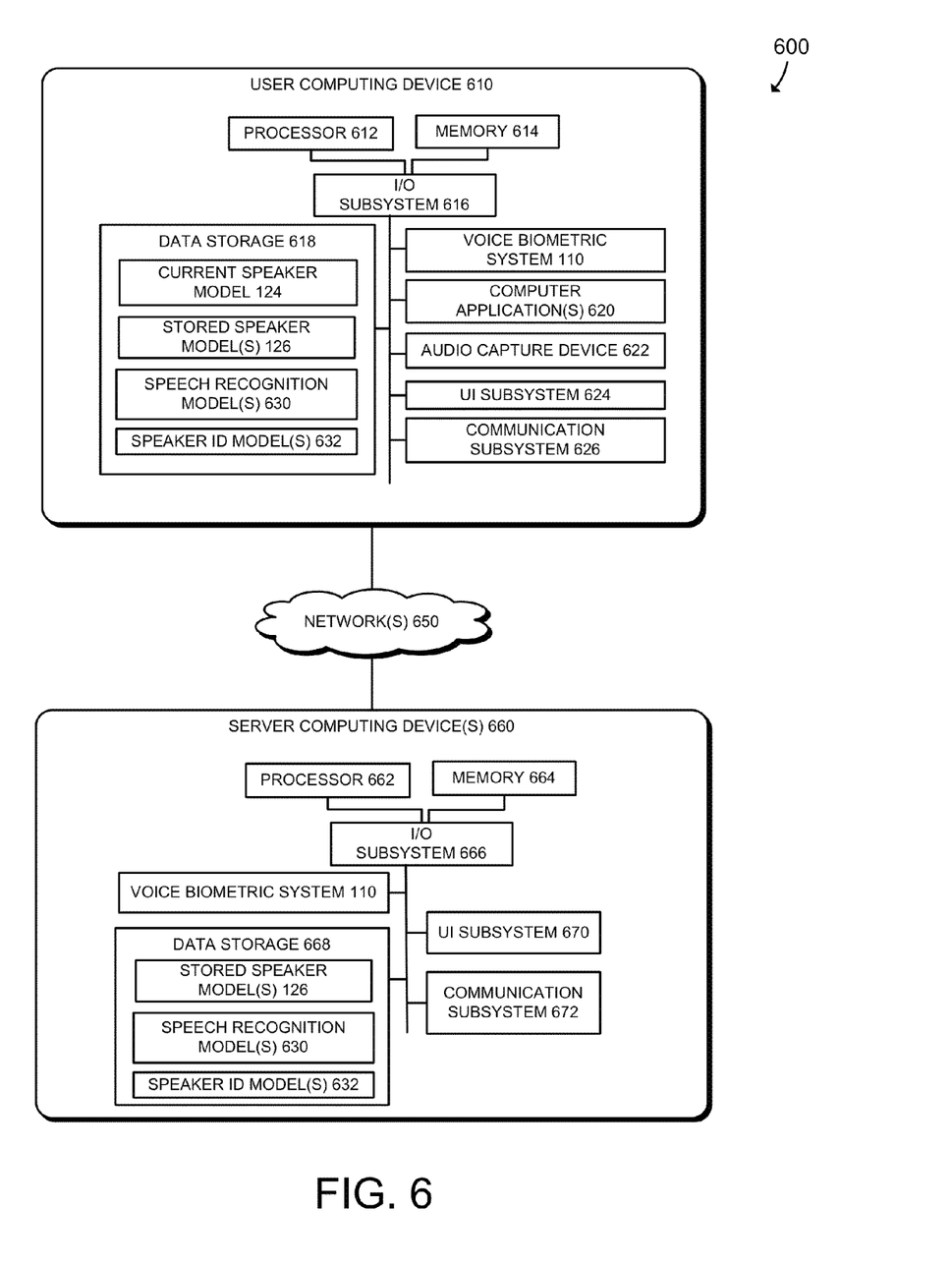
FIG. 6 is a simplified block diagram of an exemplary computing environment in connection with which at least one embodiment of the computing system of FIG. 1 may be implemented.

Referring now to FIG. 6, a simplified block diagram of an embodiment 600 of the computing system 100 is shown. While the illustrative computing system 600 is shown as involving multiple components and devices, it should be understood that in some embodiments, the computing system 600 may constitute a single computing device, alone or in combination with other devices. The computing system 600 includes a user computing device 610, which may be in communication with one or more other computing systems or devices 660 via one or more networks 650. The voice biometric system 110 or portions thereof may be distributed across multiple computing devices 610, 660 that are connected to the network(s) 650 as shown. In other embodiments, however, the voice biometric system 110 may be located entirely on the computing device 610. In some embodiments, portions of the system 110 may be incorporated into other computer applications. As used herein, "computer application" may refer to, among other things, hardware, software, a combination of hardware and software, or any level of software application (e.g., operating system, middleware, libraries, frameworks, and/or interactive user-level applications). For example, portions of the system 110 may be incorporated into or accessed by online banking applications, web-based customer service applications, intelligent assistance applications, and/or others.

The illustrative computing device 610 includes at least one processor 612 (e.g. a microprocessor, microcontroller, digital signal processor, etc.), memory 614, and an input/output (I/O) subsystem 616. The computing device 610 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of hardware and software components and/or other computing systems including the computer application(s) 620 (which may include any other applications residing on the computing device 610), the voice biometric system 110, an audio capture device 622 (e.g., one or more microphones) and the user interface subsystem 624, which includes one or more user input devices (e.g., a touchscreen, keyboard, virtual keypad, etc.) and one or more output devices (e.g., speakers, displays, LEDs, etc.). The I/O subsystem 616 is also communicatively coupled to one or more storage media 618, and a communication subsystem 626. It should be understood that each of the foregoing components and/or systems may be integrated with the computing device 610 or may be a separate component or system that is in communication with the I/O subsystem 616 (e.g., over a network 650 or a serial bus connection).

The storage media 618 may include one or more hard drives or other suitable data storage devices (e.g., flash memory, memory cards, memory sticks, and/or others). In some embodiments, portions of other computer application(s) 620 (e.g., a web-based application, mobile device application, or virtual personal assistant), the voice biometric system 110, the current speaker model 124, the stored speaker model(s) 126, one or more speech recognition model(s) 630 (including, for example, the acoustic model 116), one or more speaker identification models(s) 632 (including, for example i-vector models and/or others), and/or other data reside at least temporarily in the storage media 618. Portions of the computer application(s) 620, the voice biometric system 110, the current speaker model 124, the stored speaker model(s) 126, the speech recognition model(s) 630, and the speaker identification models(s) 632, and/or other data may be copied to the memory 614 during operation of the computing device 610, for faster processing or other reasons.

The communication subsystem 626 may communicatively couple the computing device 610 to one or more communication networks 650, e.g., a local area network, wide area network, personal cloud, enterprise cloud, public cloud, and/or the Internet, for example. Accordingly, the communication subsystem 626 may include one or more wired or wireless network interface software, firmware, or hardware, for example, as may be needed pursuant to the specifications and/or design of the particular computing system 600.

The server computing device(s) 660 may be embodied as any suitable type of computing device capable of performing the functions described herein, such as any of the aforementioned types of devices or other electronic devices. For example, in some embodiments, the server computing device(s) 660 may include one or more server computers including storage media 668, which may be used to store portions of the stored speaker model(s) 126, the speech recognition model 630, the speaker identification model(s) 632, and/or other data. The illustrative server computing device 660 also includes a user interface subsystem 670 and a communication subsystem 672, which may be embodied similarly to the components 622, 624, respectively, described above. The computing system 600 may include other components, sub-components, and devices not illustrated in FIG. 6 for clarity of the description. In general, the components of the computing system 600 are communicatively coupled as shown in FIG. 6 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a text-independent speaker recognition system includes a front end module to: process an audio signal comprising a current sample of natural language speech; identify a speech segment in the current sample of natural language speech; and create a phonetic representation of the speech segment of the current speech sample; and a back end module to: create a current speaker model based on the phonetic representation of the speech segment of the current speech sample, the current speaker model mathematically representing at least one speaker-specific phonemic characteristic of the current speech sample; and compare the current speaker model to a stored speaker model, the stored speaker model mathematically associating phonetic content with one or more other speech samples.

An example 2 includes the subject matter of example 1, wherein the front end module is to apply a neural network-based acoustic model to associate the speech segment with phonetic content. An example 3 includes the subject matter of example 2 or example 1, wherein the front end module is to align the phonetic content of the speech segment with time. An example 4 includes the subject matter of example 3, wherein the front end module is to align the phonetic content of the speech segment in lexical units, and the back end module is to compute a distance between at least one of the lexical units of the phonetic content with a similar lexical unit of the stored speaker model. An example 5 includes the subject matter of example 3, wherein the front end module is to align the phonetic content of the speech segment in tri-phones, and the back end module is to compute a distance between at least one of the tri-phones of the phonetic content with a similar tri-phone of the stored speaker model. An example 6 includes the subject matter of example 5, wherein the back end module is to disregard tri-phones of the speech segment that do not have similar tri-phones in the stored speaker model. An example 7 includes the subject matter of any of the preceding examples, wherein the front end module is to create a phonetic representation of the speech segment of the current speech sample without using a language model and without using a grammar. An example 8 includes the subject matter of any of the preceding examples, wherein the back end module is to generate an i-vector model of the speech segment using the phonetic representation of the speech segment, and the i-vector model indicates a speaker-specific pronunciation of the phonetic content of the speech segment. An example 9 includes the subject matter of any of the preceding examples, wherein the back end module is to determine, based on the phonetic representation of the speech segment, if the speaker of the current speech sample is the same as the speaker of the one or more other speech samples. An example 10 includes the subject matter of any of the preceding examples, wherein the front end module is to access information identifying the speaker of the current speech sample and retrieve the one or more other speech samples based on the information identifying the speaker of the current speech sample. An example 11 includes the subject matter of any of the preceding examples, wherein the front end module is to create the phonetic representation of the speech segment without a universal background model (UBM).

In an example 12, a front end module for a text-independent speaker recognition system includes a plurality of instructions embodied in one or more computer accessible storage media and executable by a processor to: process an audio signal including a sample of natural language speech; identify a plurality of temporal speech segments in the natural language speech sample; assign a phonetic unit of a plurality of different phonetic units to each of the speech segments of the speech sample, wherein each of the phonetic units is associated with a class of phonetic content of a plurality of classes of phonetic content; and mathematically determine speaker-specific information about the pronunciation of the speech segments in comparison to the pronunciation of the speech segments by a general population.

An example 13 includes the subject matter of example 12, wherein the front end module is to apply a partial speech recognition system comprising a hidden Markov model and a deep neural network to associate different speech segments with different phonetic units. An example 14 includes the subject matter of example 13, wherein the front end module is to determine the phonetic unit to associate with a current speech segment based on a previously-determined association of a phonetic unit with another speech segment that is temporally adjacent the current speech segment in the natural language speech sample. An example 15 includes the subject matter of any of examples 12-14, wherein the front end module is to align the phonetic units of the speech sample in tri-phones. An example 16 includes the subject matter of any of examples 12-15, wherein the front end module is to compute a plurality of statistics to determine the speaker-specific information, and the front end module is to compute the plurality of statistics using posterior probabilities of the phonetic classes. An example 17 includes the subject matter any of examples 12-16, wherein the front end module is to assign the phonetic units to the speech segments without using a language model and without using a grammar. An example 18 includes the subject matter of any of examples 12-17, wherein the front end module is to create a phonetic representation of the speech sample, the phonetic representation comprises the phonetic units associated with each of the speech segments and the speech segments, and the front end module is to provide the phonetic representation to a back end module of the speaker recognition system, wherein the back end module is to determine, based on the phonetic representation of the speech sample, if the speaker of the speech sample is the same as the speaker of one or more stored speech samples. An example 19 includes the subject matter of any of examples 12-18, wherein the front end module is to determine the speaker-specific information without a universal background model (UBM).

In an example 20, a method for text-independent speaker recognition includes, with at least one computing device: processing an audio signal comprising a current sample of natural language speech and speaker-specific information about the speaker of the current speech sample; executing a speech recognizer on the current speech sample to: identify a speech segment in the current speech sample; and create a phonetic representation of the speech segment, the phonetic representation mathematically associating phonetic content with the speech segment; and executing a speaker recognizer to create a current speaker model comprising the speech segment, the phonetic representation of the speech segment, and the speaker-specific information.

An example 21 includes the subject matter of example 20, including mathematically computing a distance between the phonetic representation of the speech segment of the current speaker model and a similar phonetic representation of the stored speaker model. An example 22 includes the subject matter of example 20 or example 21, wherein the phonetic representation of the speech segment comprises a phonetic unit assigned to a phonetic class, and the method comprises selecting a stored speaker model having a phonetic unit in the same phonetic class as the phonetic unit associated with the speech segment of the current speaker model. An example 23 includes the subject matter of any of examples 20-22, including generating the phonetic representation of the speech segment with a speech recognition-trained deep neural network. An example 24 includes the subject matter of any of examples 20-23, including aligning the phonetic representation of the speech segment in tri-phones, analyzing the similarity of at least one of the tri-phones with a similar tri-phone of the stored speaker model, and disregarding tri-phones of the speech segment that do not have similar tri-phones in the stored speaker model. An example 25 includes the subject matter of any of examples 20-24, including creating the phonetic representation of the speech segment of the current speech sample without using a language model and without using a grammar. An example 26 includes the subject matter of any of examples 20-25, including mathematically determining a speaker-specific pronunciation of the speech segment in comparison to a speaker population. An example 27 includes the subject matter of any of examples 20-27, including determining, based on the phonetic representation of the speech segment, if the speaker of the current speech sample is the same as the speaker of the one or more other speech samples. An example 28 includes the subject matter of any of examples 20-28, including determining a phonetic representation to associate with the speech segment based on a previously-determined association of another phonetic representation with another speech segment that is temporally adjacent the speech segment in the current speech sample. An example 29 includes the subject matter of any of examples 20-29, including analyzing the similarity of the current speaker model to a stored speaker model, the stored speaker model comprising mathematical associations of phonetic content with one or more other speech samples.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A text-independent speaker recognition system comprising:
   a front end module embodied in one or more non-transitory computer readable media and executable by at least one computer device to: process an audio signal comprising a current sample of natural language speech; identify a speech segment in the current sample of natural language speech; and create a phonetic representation of the speech segment of the current speech sample; and
   a back end module embodied in one or more non-transitory computer readable media and executable by at least one computer device to: create a current speaker model based on the phonetic representation of the speech segment of the current speech sample, the current speaker model mathematically representing at least one speaker-specific phonemic characteristic of the current speech sample; and compare the current speaker model to a stored speaker model, the stored speaker model mathematically associating phonetic content with one or more other speech samples;
   wherein the front end module is to apply a neural network-based acoustic model to associate the speech segment with phonetic content;
   wherein the front end module is to align the phonetic content of the speech segment with time; and
   wherein the front end module is to align the phonetic content of the speech segment in lexical units, and the back end module is to compute a distance between at least one of the lexical units of the phonetic content with a similar lexical unit of the stored speaker model.

2. A text-independent speaker recognition system comprising:
   a front end module embodied in one or more non-transitory computer readable media and executable by at least one computer device to: process an audio signal comprising a current sample of natural language speech; identify a speech segment in the current sample of natural language speech; and create a phonetic representation of the speech segment of the current speech sample; and
   a back end module embodied in one or more non-transitory computer readable media and executable by at least one computer device to: create a current speaker model based on the phonetic representation of the speech segment of the current speech sample, the current speaker model mathematically representing at least one speaker-specific phonemic characteristic of the current speech sample; and compare the current speaker model to a stored speaker model, the stored speaker model mathematically associating phonetic content with one or more other speech samples;
   wherein the front end module is to apply a neural network-based acoustic model to associate the speech segment with phonetic content;
   wherein the front end module is to align the phonetic content of the speech segment with time; and
   wherein the front end module is to align the phonetic content of the speech segment in tri-phones, and the back end module is to compute a distance between at least one of the tri-phones of the phonetic content with a similar tri-phone of the stored speaker model.

3. A text-independent speaker recognition system comprising:
   a front end module embodied in one or more non-transitory computer readable media and executable by at least one computer device to: process an audio signal comprising a current sample of natural language speech; identify a speech segment in the current sample of natural language speech; and create a phonetic representation of the speech segment of the current speech sample; and
   a back end module embodied in one or more non-transitory computer readable media and executable by at least one computer device to: create a current speaker model based on the phonetic representation of the speech segment of the current speech sample, the current speaker model mathematically representing at least one speaker-specific phonemic characteristic of the current speech sample; and compare the current speaker model to a stored speaker model, the stored speaker model mathematically associating phonetic content with one or more other speech samples;
   wherein the front end module is to apply a neural network-based acoustic model to associate the speech segment with phonetic content;
   wherein the front end module is to align the phonetic content of the speech segment with time;
   wherein the front end module is to align the phonetic content of the speech segment in tri-phones, and the back end module is to compute a distance between at least one of the tri-phones of the phonetic content with a similar tri-phone of the stored speaker model; and wherein the back end module is to disregard tri-phones of the speech segment that do not have similar tri-phones in the stored speaker model.

4. A front end module for a text-independent speaker recognition system, the front end module embodied in one or more non-transitory computer readable media and executable by at least one computer device comprising a plurality of instructions embodied in one or more computer accessible storage media and executable by a processor to:
process an audio signal comprising a sample of natural language speech;
identify a plurality of temporal speech segments in the natural language speech sample;
assign a phonetic unit of a plurality of different phonetic units to each of the speech segments of the speech sample, wherein each of the phonetic units is associated with a class of phonetic content of a plurality of classes of phonetic content; and
mathematically determine speaker-specific information about the pronunciation of the speech segments in comparison to the pronunciation of the speech segments by a general population;
wherein the front end module is to apply a partial speech recognition system comprising a hidden Markov model and a deep neural network to associate different speech segments with different phonetic units; and
wherein the front end module is to determine the phonetic unit to associate with a current speech segment based on a previously-determined association of a phonetic unit with another speech segment that is temporally adjacent the current speech segment in the natural language speech sample.

5. A front end module for a text-independent speaker recognition system, the front end module embodied in one or more non-transitory computer readable media and executable by at least one computer device comprising a plurality of instructions embodied in one or more computer accessible storage media and executable by a processor to:
process an audio signal comprising a sample of natural language speech;
identify a plurality of temporal speech segments in the natural language speech sample;
assign a phonetic unit of a plurality of different phonetic units to each of the speech segments of the speech sample, wherein each of the phonetic units is associated with a class of phonetic content of a plurality of classes of phonetic content; and
mathematically determine speaker-specific information about the pronunciation of the speech segments in comparison to the pronunciation of the speech segments by a general population;
wherein the front end module is to compute a plurality of statistics to determine the speaker-specific information, and the front end module is to compute the plurality of statistics using posterior probabilities of the phonetic classes.

6. A method for text-independent speaker recognition, the method comprising, with code embodied in one or more non-transitory computer readable media and executable by at least one computing device:
processing an audio signal comprising a current sample of natural language speech and speaker-specific information about the speaker of the current speech sample;
executing a speech recognizer on the current speech sample to: identify a speech segment in the current speech sample; and create a phonetic representation of the speech segment, the phonetic representation mathematically associating phonetic content with the speech segment;
executing a speaker recognizer to create a current speaker model comprising the speech segment, the phonetic representation of the speech segment, and the speaker-specific information; and
mathematically computing a distance between the phonetic representation of the speech segment of the current speaker model and a similar phonetic representation of the stored speaker model.

7. A method for text-independent speaker recognition, the method comprising, with code embodied in one or more non-transitory computer readable media and executable by at least one computing device:
processing an audio signal comprising a current sample of natural language speech and speaker-specific information about the speaker of the current speech sample;
executing a speech recognizer on the current speech sample to: identify a speech segment in the current speech sample; and create a phonetic representation of the speech segment, the phonetic representation mathematically associating phonetic content with the speech segment; and
executing a speaker recognizer to create a current speaker model comprising the speech segment, the phonetic representation of the speech segment, and the speaker-specific information;
wherein the phonetic representation of the speech segment comprises a phonetic unit assigned to a phonetic class, and the method comprises selecting a stored speaker model having a phonetic unit in the same phonetic class as the phonetic unit associated with the speech segment of the current speaker model.

8. A method for text-independent speaker recognition, the method comprising, with code embodied in one or more non-transitory computer readable media and executable by at least one computing device:
processing an audio signal comprising a current sample of natural language speech and speaker-specific information about the speaker of the current speech sample;
executing a speech recognizer on the current speech sample to: identify a speech segment in the current speech sample; and create a phonetic representation of the speech segment, the phonetic representation mathematically associating phonetic content with the speech segment; executing a speaker recognizer to create a current speaker model comprising the speech segment, the phonetic representation of the speech segment, and the speaker-specific information; and
comprising aligning the phonetic representation of the speech segment in tri-phones, analyzing the similarity of at least one of the tri-phones with a similar tri-phone of the stored speaker model, and disregarding tri-phones of the speech segment that do not have similar tri-phones in the stored speaker model.

9. A method for text-independent speaker recognition, the method comprising, with code embodied in one or more non-transitory computer readable media and executable by at least one computing device:
processing an audio signal comprising a current sample of natural language speech and speaker-specific information about the speaker of the current speech sample;
executing a speech recognizer on the current speech sample to: identify a speech segment in the current speech sample; and create a phonetic representation of the speech segment, the phonetic representation mathematically associating phonetic content with the speech segment; executing a speaker recognizer to create a current speaker model comprising the speech segment, the phonetic representation of the speech segment, and the speaker-specific information; and
comprising determining a phonetic representation to associate with the speech segment based on a previously-determined association of another phonetic representation with another speech segment that is temporally adjacent the speech segment in the current speech sample.

* * * * *